United States Patent [19]

Blanc et al.

[11] 4,162,903
[45] Jul. 31, 1979

[54] PHYSICAL SOLVENT ABSORPTION OF CARBON DIOXIDE AND HYDROGEN SULPHIDE FOR THE DEACIDIFICATION OF INDUSTRIAL GASEOUS MIXTURES

[75] Inventors: Claude Blanc; Jean-Yves Chénard, both of Pau; Jean-Jacques Delpuech, Laxou; Olivier Oliveau, Lescar, all of France

[73] Assignee: Societe Nationale Elf Aquitaine (Production), Paris, France

[21] Appl. No.: 884,211

[22] Filed: Mar. 8, 1978

[30] Foreign Application Priority Data

Mar. 9, 1977 [FR] France ................................ 77 06953

[51] Int. Cl.² ......................................... B01D 19/00
[52] U.S. Cl. ..................................................... 55/73
[58] Field of Search ...................... 55/68, 73; 423/243, 423/223, 226

[56] References Cited

U.S. PATENT DOCUMENTS

| 2,634,824 | 4/1953 | Drake et al. | 55/68 |
| 3,590,555 | 7/1971 | Wackernagel | 55/73 |

Primary Examiner—Bernard Nozick
Attorney, Agent, or Firm—Brisebois & Kruger

[57] ABSTRACT

The present invention is related to a process for absorbing acid gases from industrial gaseous mixtures by washing under pressure with a solvent. The invention is concerned more particularly with the use of hexamethyl phosphorotriamide $OP[N(CH_3)_2]_3$, pure or mixed with water, as a physical solvent of acid gases.

This new physical solvent is of particular interest in the treatment of natural acid gases and refinery gases.

5 Claims, 2 Drawing Figures

PHYSICAL SOLVENT ABSORPTION OF CARBON DIOXIDE AND HYDROGEN SULPHIDE FOR THE DEACIDIFICATION OF INDUSTRIAL GASEOUS MIXTURES

The present invention is related to a process for absorbing acid gases from industrial gaseous mixtures by washing under pressure with a solvent.

Gaseous mixtures such a natural gases, synthesis gases or refinery gases, having a high total pressure and/or a proportion of acid components, contain, besides desirable products such as CO, $H_2$ and hydrocarbons, a certain number of undesirable compounds such as $H_2S$, $CO_2$, COS, $CS_2$ or mercaptans.

In order to eliminate the sulphur impurities other than $H_2S$, the conventional treatment processes, for example amine washing, require further purification steps.

The solvents called "physical", that is to say which do not chemically combine with the components to be eliminated, simultaneously absorb all the undesirable components in one washing operation; furthermore they present the following advantages:

their $CO_2$ and $H_2S$ absorption capactiy exceeds that of aqueous amine solutions as soon as the partial pressures of these components is higher than a few bars;

the majority of them are regenerable by a simple flash operation;

they have a low calorific capacity;

these solvents release far less heat than aqueous amine solutions during the absorption of $H_2S$ and $CO_2$.

These properties usually give rise to appreciable reductions in energy costs with respect to the amine washing process.

These solvents are, on the other hand, relatively expensive and exhibit a stronger affinity than conventional mixtures with the hydrocarbons present in the gas. Thus this necessitates a modification in the corresponding processes in order to limit the losses in solvent and hydrocarbons.

It is well known, to a man skilled in the art, that the most appropriate physical solvents, that is to say those which exhibit, in weight, the highest absorption capacities for $H_2S$ and $CO_2$, are compounds having a low molecular weight, but they cannot be used since they lead to a considerable co-absorption of hydrocarbons and display vapor pressures which are too elevated for their considered use.

The process according to the invention palliates these difficulties by the use of a solvent having a very strong absorption capacity for $H_2S$ and $CO_2$ while its absorption capacity for the aromatic and aliphatic hydrocarbons present in the gas does not exceed that of the usual physical solvents.

According to the invention the deacidification of a gas mixture containing acid impurities, for example, hydrogen sulphide and/or carbon dioxide, each having a partial pressure of at least one bar, consists in washing the said gas by means of a solvent, pure or mixed with water, in an absorption column maintained at a total pressure higher than atmospheric pressure and at a temperature comprised between 10° and 80° C., the said solvent belonging to the mono, di or tri phosphoroamides having the formula:

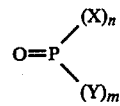

in which
X is a radical

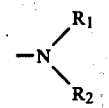

Y is a radical —O—$R_3$ $R_1$, $R_2$ and $R_3$ are $C_1$ to $C_4$ alkyl radical and $n+m=3$, n being different from zero, and being liquid at a temperature above 40° C., exhibiting at 40° C. a $CO_2$ absorption capacity of at least 0.5% per bar of partial pressure of this component, a methane absorption capacity of less than 0.015% by weight per bar of partial pressure of this component and a vapor pressure less than 0.5 Torrs at 40° C.

In one embodiment of the process, the solvent is hexamethyl phosphorotriamide, shortened to HMPT, having the formula:

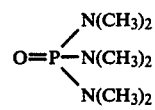

In other embodiments, the deacidification process, according to the invention, is used for treating a gas mixture containing, besides $H_2S$ and/or $CO_2$ acid impurities, at least one of the compounds of the group comprising COS, $CS_2$, mercaptans, sulphides and disulfides.

The process according to the invention applies especially to gases chosen from the group comprising hydrocarbon gases, carbon oxide, nitrogen, steam and their mixtures.

The advantages of HMPT as a solvent are shown in Table 1 which gives the HMPT's solubility values at 40° C.

The vapor pressure of the HMPT (0.2 Torrs at 40° C.) is sufficiently low to limit the losses of solvent due to volatility. Moreover, the HMPT exhibits a viscosity (3.47 cP at 20° C.), a heat capacity (0.444 cal/°C./g at 50° C.) and a chemical stability compatible with the utilization according to the invention

TABLE 1

| Components | Pressure | Solubility (% by weight) |
|---|---|---|
| $H_2S$ | 1 bar | 5 |
|  | 5 bars | 23 |
|  | 10 bars | 41 |
| $CO_2$ | 1 bar | 0.6 |
|  | 5 bars | 3 |
|  | 10 bars | 6 |
| $CH_4$ | 30 bars | 0.38 |
|  | 60 bars | 0.78 |
| Ethane | 1 bar | 0.22 |
| Propane | 1 bar | 0.72 |
| Hexane | 114 torrs | 6.1 |
| Benzene | 72 torrs | 26 |
| Toluene | 19 torrs | 20 |

The gaseous mixtures, which the invention concerns, contain $H_2S$ and/or $CO_2$—each having a partial pressure of at least one bar—and at least one of the compounds of the group comprising hydrocarbons, hydrogen and carbon oxide. These gaseous mixtures can also contain, without any prejudice, COS, $CS_2$, mercaptans, sulphides or disulfides, nitrogen or water vapor. The process, according to the invention consists in washing the gas gaseous mixtures with pure HMPT or HMPT containing 0 to 25% by weight of water, in a tray or packed column, at a total pressure higher than atmospheric pressure and at a temperature comprised between 10° and 80° C. The rich solvent is essentially regenerated by at least two successive expansion or flash operation steps, the mixture obtained in the first expansion or flash step being recycled in the absorber. The solvent is then reheated and stripped with an inert gas (a purified gas, for example), or with steam.

The invention will be better understood by the following description and the appended, non-limitative, flow sheets of industrial plants adapted to carry out the treatment of acid gases according to the invention:

Figure 1:
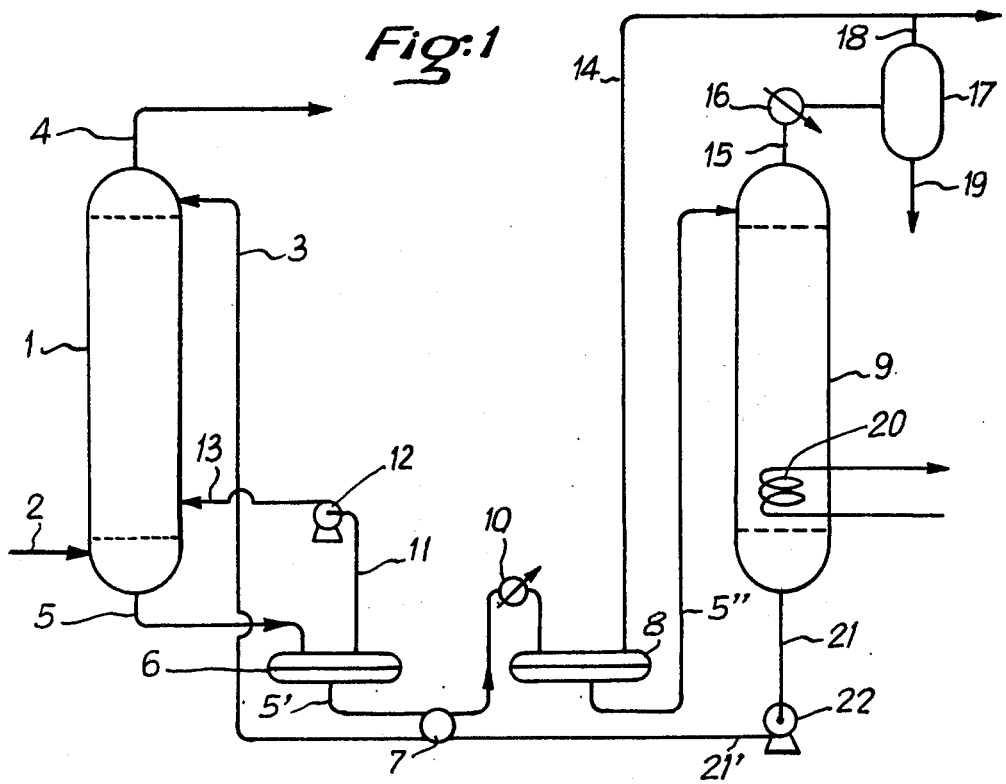
FIG. 1 is a flow sheet of an industrial plant comprising an absorption column fed at only one level in solution.

FIG. 1 gives a flow sheet of a complete deacidification plant of a gaseous mixture.

This plant comprises an absorption column 1, in the bottom of which a raw gas is fed by inlet pipe 2 while in its upper part the solvent is fed through inlet pipe 3; the top of the said column furthermore comprises an outlet conduit 4 for discharging the purified gas while its bottom is provided with an outlet conduit 5 for the $H_2S$ and/or $CO_2$ enriched solvent.

Outlet conduit 5 enters the upper part of a high pressure degassing drum 6 at the bottom of which an outlet conduit 5' discharges the solution which, after passage through a heat exchanger 7, is fed in the upper part of a low pressure degassing drum 8 at the bottom of which the solution is discharged through inlet conduit 5" entering the upper part of the regenerator column 9.

A heating device 10 usually fed with steam is provided on said outlet conduit 5' between heat exchanger 7 and low pressure degassing drum 8.

A conduit 11, issuing from the high pressure degassing drum 6 allows the collection of hydrocarbon gases consisting essentially of methane; said gases after passage through compressor 12 are fed by pipe 13 into the lower part of absorption column 1. From low pressure degassing drum 8 issues a discharge pipe 14 which evacuates a solvent-free gaseous mixture.

A conduit 15 issuing from the top of regeneration column 9, after passage through cooling system 16, enters the middle part of decanter 17.

A conduit 18 issuing from the top of said decanter 17 leads the gaseous wastes to discharge into pipe 14, while a conduit 19 allows the discharge of water.

The heating of the lower part of regeneration column 9 is either operated directly by the introduction of overheated steam in the colummn or indirectly by means of a conventional boiler.

At the lower part of regeneration column 9, a conduit 21 collects the regenerated solvent which, by means of recirculation pump 22, is recycled through pipe 21' to the upper part of absorption column 1, after passage through heat exchanger 7.

The operating conditions of such an installation are the following:

the raw gas, at a pressure of between 10 and 100 bars, is fed by inlet pipe 2 at the bottom of column 1;

in absorption column 1 a stripping is carried out; the liquid solvent is injected at the upper part of column 1 and discharged at the lower part after enrichment in $H_2S$ and $CO_2$.

The thus enriched solvent is then fed successively into a high pressure degassing drum 6 where its pressure is lowered to an intermediary value which is a function of the initial pressure of the raw gas, into a low pressure degassing drum 8, where its pressure is further lowered to about 2 bars and then into the regeneration column 9 at the said pressure of about 2 bars, where the acid gases are further eliminated due to the temperature increases produced by a heat exchange with steam.

In high pressure degassing drum 6, the hydrocarbons are removed from the solution and, after recompression by means of a compressor 12 are injected in the lower part of absorption column 1.

In low pressure degassing drum 8, most of the $H_2S$ and $CO_2$ are removed from the solution and form a gaseous flow which via conduit 14 is sent to a sulphur-producing or a thiochemistry plant.

The regenerated solvent is recycled by circulation pump 22 to the upper part of absorption column 1 for a new cycle.

Figure 2:
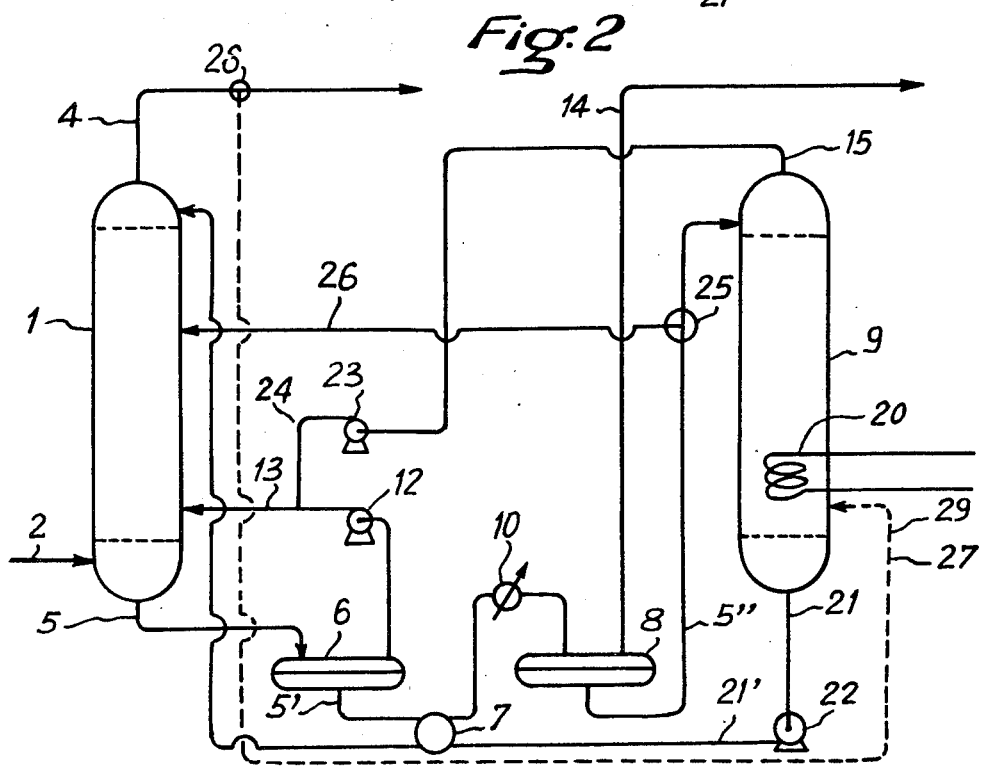
FIG. 2 is a flow sheet of an industrial plant comprising an absorption column fed at several levels in solution.

FIG. 2 is a flow sheet of a complete deacidification plant of a gaseous mixture, the solvent being fed at several levels and at various concentrations in the absorption column, the regeneration occuring by means of gas freed of any sulphur compounds. The plant shown in FIG. 2 is a more complex one that that represented in FIG. 1. This double split flow plant is preferably used for implementing the process according to the invention since substantial amounts of energy are economized at the regeneration level with respect to the flow sheet of FIG. 1, due to the fact that only a part—generally less than a third—of the solvent is completely regenerated.

The flow sheet of FIG. 2 comprises the same main items as shown in FIG. 1, that is absorption column 1, regeneration column 9, high pressure and low pressure degassing drums, 6 and 8 respectively, outlet conduits 5, 5' and 5" for the $H_2S$-enriched solvent, conduit 21 and pipe 21' for the regeneration solvents, heat exchanger 7 in which conduit 5' and pipe 21' pass, heating device 10, circulation pump 22 and compressor 12.

Conduit 11 issuing from the top of high pressure degassing drum 6 leads to compressor 12, the outlet of which is connected to absorption column 1 through conduit 13, and associated by an injection means placed at the lower portion of absorption column 1.

Conduit 15 issuing from the top of regeneration column 9, after passing through compressor 23, continues as conduit 24 which leads to conduit 13.

Outlet conduit 5", which joins the bottom of low pressure degassing drum 8 to the upper part of regeneration column 9, comprises a valve system 25 which allows part of the liquid flow of outlet conduit 5" to be sent to absorption column 1 via pipe 26 and associated injector means is usually placed at a level between the middle and two thirds of the absorption column's height.

Conduit 27 connects pipe 4 to the lower part of regeneration column 9, via controlled gas offtake 28 and injection means 29.

FIG. 2 shows by way of example how to introduce at different levels of column 1 and at different concentrations the solvent fed by conduits 13 and 26. It also shows how to inject at the bottom of regeneration columm 9 via conduit 27 a part of the gas offtake issuing from the top of column 1 through pipe 4.

The invention will now be described in the following non-limiting example of operating conditions and compositions of the various gaseous and liquid fractions obtained in the plant such as shown in FIG. 1 flow sheet.

EXAMPLE 1

A raw natural gas having the following composition (by volume):
CH$_4$: 75%
H$_2$S: 15%
CO$_2$: 9.8%
C$^{2+}$: 0.2%
is fed to a preliminary separator of a deacidification plant at a temperature of 15° C. and a total pressure of 80 bars. The raw gas inflow rate is 500,000 Nm$^3$/d; said gas is stripped in an absorber by 104 t/h of HMPT. The temperature at the bottom of the absorber is 40° C. The enriched solvent is then flashed in a degassing drum at a pressure of 14 bars. The resulting gaseous phase consists in 0.2 t/h of a gas comprising (by volume):
H$_2$S: 8.1%
CO$_2$: 40%
CH$_4$: 51.9%
This gas is repressured and reinjected into the bottom of the absorption column. The rich solvent is then reheated to 100° C. and introduced into a second flash drum under a pressure of 2 bars, then into a regenerator where it is stripped by steam. The gaseous wastes of these last steps constitute an acid gas comprising (by volume):
H$_2$S: 59.1%
CO$_2$: 38.5%
CH$_4$: 2.4%
which represents a methane loss of 0.8% of the initial methane contained in the raw gas.

The invention is not limited to the embodiments and examples describd herein above. Many variants and modifications can be envisaged by those skilled in the art, without departing from the spirit and the scope of the invention as defined in the appended claims.

What is claimed is:

1. A process for the absorption of impurities from a gas mixture that contains at least one impurity selected from the group consisting of H$_2$S, CO$_2$, COS, CS$_2$, mercaptans, sulfides and disulfides, each having a partial pressure of at least one bar, said process consisting in contacting the gas mixture with a solvent, pure or mixed with water, in an absorption zone maintained at a total pressure higher than atmospheric pressure and at a temperature between 10° and 80° C., said solvent having the formula:

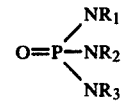

wherein R$_1$, R$_2$, and R$_3$ are C$_1$ to C$_4$ alkyl radicals, said solvent being liquid at a temperature above 40° C., exhibiting at 40° C. a CO$_2$ absorption capacity of at least 0.5% by weight per bar of partial pressure of this component, a methane capacity of less than 0.015% by weight per bar of partial pressure of this component and a vapor pressure less than 0.5 Torrs at 40° C., and removing from said absorption zone said solvent having absorbed therein H$_2$S and/or CO$_2$.

2. A process according to claim 1, wherein said solvent is mixed with between 10 and 25% by weight of water.

3. A deacidification process according to claim 1, wherein said gas mixture is a raw natural gas.

4. A process according to claim 1, wherein the solvent is hexamethyl phosphorotriamide having the formula:

5. A process according to claim 4, wherein said solvent is mixed with 10–25% by weight of water.